US012665499B2

(12) United States Patent
Elshaer

(10) Patent No.: US 12,665,499 B2
(45) Date of Patent: Jun. 23, 2026

(54) ISOLATED HIGH VOLTAGE DC/DC CONVERTER WITH BATTERY CURRENT CONTROL MODULE COMPONENTS FOR CHARGING TRACTION BATTERY

(71) Applicant: FORD GLOBAL TECHNOLOGIES, LLC, Dearborn, MI (US)

(72) Inventor: Mohamed Elshaer, Canton, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 294 days.

(21) Appl. No.: 18/463,536

(22) Filed: Sep. 8, 2023

(65) Prior Publication Data

US 2025/0088095 A1     Mar. 13, 2025

(51) Int. Cl.
| | |
|---|---|
| *H02M 1/14* | (2006.01) |
| *B60L 50/60* | (2019.01) |
| *H02M 1/42* | (2007.01) |
| *H02M 1/44* | (2007.01) |
| *H02M 3/335* | (2006.01) |
| *H02P 27/06* | (2006.01) |

(52) U.S. Cl.
CPC ........... *H02M 1/4233* (2013.01); *B60L 50/60* (2019.02); *H02M 1/14* (2013.01); *H02M 1/44* (2013.01); *H02M 3/33573* (2021.05); *H02M 3/33584* (2013.01); *H02P 27/06* (2013.01); *B60L 2210/10* (2013.01); *B60L 2210/30* (2013.01)

(58) Field of Classification Search
CPC .......... H02M 1/007; H02M 7/66; H02M 7/48; H02M 7/79; H02M 7/797; H02M 1/14; H02M 1/143; H02M 1/15; H02M 3/335; H02M 3/33573; H02M 3/33584; H02P 27/06; B60L 2210/10
See application file for complete search history.

(56) References Cited

U.S. PATENT DOCUMENTS

| | | | |
|---|---|---|---|
| 10,189,357 B2 | 1/2019 | Zou et al. | |
| 12,319,156 B2 * | 6/2025 | Elshaer | B60L 53/20 |
| 2014/0063874 A1 * | 3/2014 | Liu | H02J 3/381 |
| | | | 363/40 |
| 2017/0282747 A1 | 10/2017 | Wang | |
| 2018/0006575 A1 * | 1/2018 | Chapman | H02M 1/15 |
| 2018/0241337 A1 * | 8/2018 | Zou | B60L 3/003 |
| 2020/0324665 A1 * | 10/2020 | Mackenzie | B60L 53/22 |
| 2021/0404078 A1 * | 12/2021 | Srinivasan | C25B 1/02 |
| 2022/0224250 A1 * | 7/2022 | Koerner | H02M 1/10 |
| 2025/0038649 A1 * | 1/2025 | Elshaer | H02M 1/007 |

FOREIGN PATENT DOCUMENTS

| | | |
|---|---|---|
| CA | 2732525 C | 2/2010 |
| CN | 209776194 U | 12/2019 |
| JP | 2020527321 A | 9/2020 |

* cited by examiner

*Primary Examiner* — Gary L Laxton
(74) *Attorney, Agent, or Firm* — David B. Kelley; Brooks Kushman P.C.

(57)     ABSTRACT
An automotive power system has a first circuit arrangement including an AC/DC power converter, a transformer, a first switching bridge connected between the AC/DC power converter and transformer, and a second switching bridge connected between a traction battery and transformer such that the first switching bridge, transformer, and second switching bridge form an isolated DC/DC power converter.

19 Claims, 9 Drawing Sheets

ISOLATED HIGH VOLTAGE DC/DC CONVERTER WITH BATTERY CURRENT CONTROL MODULE COMPONENTS FOR CHARGING TRACTION BATTERY

TECHNICAL FIELD

This disclosure relates to automotive power systems.

BACKGROUND

An automotive vehicle may use electrical energy to power an electric machine. The electric machine may convert this electrical energy to mechanical energy to propel the vehicle. The automotive vehicle may include various power electronics equipment to condition and store the electrical energy.

SUMMARY

An automotive power system has a first switching bridge, a first circuit arrangement including an AC/DC power converter, a transformer, a second switching bridge connected between the AC/DC power converter and transformer, and a plurality of switches connected with an output of the transformer and that connect the output with the first switching bridge such that the first switching bridge is connected between a traction battery and the transformer, and the first switching bridge, transformer, and second switching bridge form an isolated DC/DC power converter. The automotive power system also has an electromagnetic interference filter, one or more switches that directly connect the traction battery between the AC/DC power converter and second switching bridge via the electromagnetic interference filter, an active ripple energy storage circuit, including an inductor, connected between the AC/DC power converter and one or more switches, and a second circuit arrangement including a coil magnetically coupled with the inductor, a third switching bridge, and a switch connected between the coil and third switching bridge.

A method includes, responsive to a single-phase AC source being connected with a first circuit arrangement that includes an AC/DC power converter, a transformer, a first switching bridge connected between the AC/DC power converter and transformer, and a plurality of switches connected with an output of the transformer and that connect the output with a second switching bridge such that the second switching bridge is connected between a traction battery and the transformer, and the first switching bridge, transformer, and second switching bridge form an isolated DC/DC power converter, opening a switch of a second circuit arrangement that includes a coil magnetically coupled with an inductor of an active ripple energy storage circuit connected between the AC/DC power converter and first switching bridge to disconnect a DC bus from the coil.

A vehicle has a traction battery, a first circuit arrangement including an AC/DC power converter, a transformer, a first switching bridge connected between the AC/DC power converter and transformer, and a second switching bridge connected between the traction battery and transformer such that the first switching bridge, transformer, and second switching bridge form an isolated DC/DC power converter. The vehicle also has an active ripple energy storage circuit, including an inductor, connected between the AC/DC power converter and second switching bridge, and a second circuit arrangement including a coil magnetically coupled with the inductor, a third switching bridge, and a switch connected between the coil and third switching bridge.

DETAILED DESCRIPTION

Figures 1, 2:
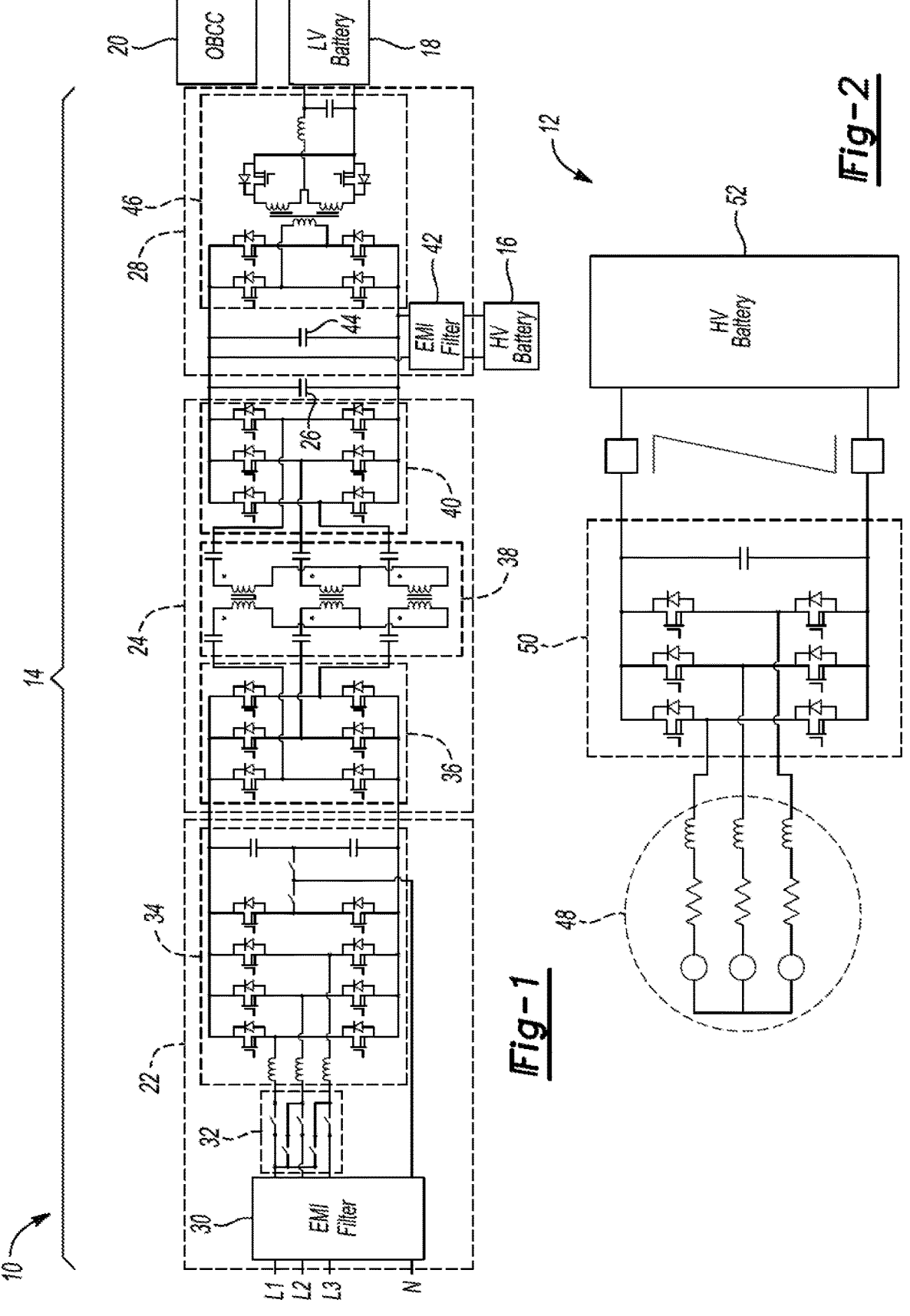
FIG. 1 is a schematic diagram of a system including a battery current control module.
FIG. 2 is a schematic diagram of a system including an inverter system controller.

Embodiments are described herein. It is to be understood, however, that the disclosed embodiments are merely examples and other embodiments may take various and alternative forms. The figures are not necessarily to scale. Some features could be exaggerated or minimized to show details of particular components. Therefore, specific structural and functional details disclosed herein are not to be interpreted as limiting, but merely as a representative basis for teaching one skilled in the art.

Various features illustrated and described with reference to any one of the figures may be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Battery current control modules (BCCMs) are components in automotive vehicles, particularly those with electric or hybrid powertrains. These modules play a role in managing the flow of electric current to and from the battery.

BCCMs function as control units that interface between the battery, the charging system, and the electrical loads. They monitor and control various parameters such as battery state of charge, voltage, and temperature, and based on this information, they manage the flow of current to the battery.

BCCMs may facilitate charging control by overseeing the charging process of the battery, and managing the voltage and current supplied by the charging system. By monitoring the battery's state of charge and adjusting the charging parameters accordingly, BCCMs attempt to ensure the battery receives the appropriate level of charge to maintain performance.

Similarly, BCCMs may be responsible for discharging control. They can manage the current output from the battery to the electrical loads in the vehicle. By controlling the current flow, BCCMs may ensure a controlled supply of power to the various electrical components and systems.

BCCMs may also implement various measures for the battery. For instance, they may monitor battery temperature to prevent overheating. They may also detect overvoltage or undervoltage situations and implement measures to preclude short circuits or excessive current draw.

Communication interfaces are often incorporated into BCCMs. These interfaces, such as Controller Area Network (CAN) or LIN (Local Interconnect Network), allow BCCMs to exchange information with other vehicle systems, including the engine control unit (ECU) or the body control module (BCM). This enables coordinated operation and integrated control across various vehicle functions. BCCMs can receive commands or instructions from other control units and adjust current flow accordingly.

BCCMs may feature diagnostic capabilities. These modules can monitor the health and performance of the battery system. They can log codes and provide diagnostic information, facilitating maintenance.

Inverter system controllers (ISCs) are also components in automotive vehicles with electric powertrains. They play a role in managing and controlling the power flow between the battery and electric motor. A function of an inverter system controller is to convert direct current (DC) from the battery into alternating current (AC) to power the electric motor.

ISCs may act as a decision maker for the power electronics system. It may monitor various parameters such as motor speed, torque, and temperature to ensure operation.

A task of ISCs is to convert DC power from the battery into three-phase AC power suitable for the electric motor. It may utilize high-power semiconductor devices, for example insulated-gate bipolar transistors (IGBTs), to control the switching of current and voltage. By modulating the pulse width and frequency of the AC waveform, the inverter system controller manages the speed and torque output of the electric motor.

ISCs may provide control over the electric motor. They may use algorithms and control strategies to manage motor speed, torque, and direction of rotation. By adjusting the switching patterns of the IGBTs, the controller can vary the frequency and amplitude of the AC waveform, altering motor operation.

ISCs can facilitate regenerative braking. During slowing or braking, the electric motor operates as a generator, converting the vehicle's kinetic energy into electrical energy. The inverter system controller may control the flow of energy, directing it back to the battery for storage.

ISCs may be responsible for managing the thermal conditions of the power electronics system. They may monitor the temperature of the inverter and electric motor, and employ cooling systems such as fans, liquid cooling, or heat sinks to dissipate excess heat and maintain operating temperatures.

ISCs may incorporate diagnostic capabilities to detect and protect against faults in the power electronics system. They may monitor various parameters such as voltage, current, and temperature values that could indicate a potential fault. If a fault is detected, the controller may take corrective actions such as shutting down the system, activating other measures, or providing fault codes for diagnostic purposes.

ISCs often feature communication interfaces such as CAN or Ethernet, enabling integration with other vehicle systems. They may exchange information with the main control unit, enabling coordinated operation and facilitating diagnostics and troubleshooting. Communication interfaces also allow the controller to receive commands or instructions from the electronic control unit (ECU) and adjust the power output accordingly.

ISCs may incorporate features such as overvoltage and undervoltage monitoring, overcurrent monitoring, and isolation monitoring.

Integrating the BCCM with the ISC is conventionally considered a challenge due to the disconnecting circuitry. The schematics of typical separate systems 10, 12 are shown in FIGS. 1 and 2, respectively.

Referring to FIG. 1, the system 10 includes a BCCM 14, a traction battery 16, an auxiliary battery 18, and an onboard charge controller 20. The BCCM includes an AC/DC power factor correction circuit 22, an isolated high voltage DC/DC circuit 24, a link capacitor 26, and an isolated high voltage to low voltage DC/DC circuit 28. The isolated high voltage DC/DC circuit 24 is connected between the AC/DC power factor correction circuit 22 and link capacitor 26. The link capacitor 26 is connected between the isolated high voltage DC/DC circuit 24 and the isolated high voltage to low voltage DC/DC circuit 28. The traction battery 16 and auxiliary battery 18 are connected with the isolated high voltage to low voltage DC/DC circuit 28.

The AC/DC power factor correction circuit 22 includes an electromagnetic interference filter 30, a switch bank 32, and AC/DC power converter circuitry 34. The switch bank 32 is connected between the electromagnetic interference filter 30 and AC/DC power converter circuitry 34.

The isolated high voltage DC/DC circuit 24 includes a first switching bridge 36, a transformer 38, and a second switching bridge 40. The first switching bridge 36 is directly connected with the power converter circuitry 34. The transformer 38 is connected between the first and second switching bridges 36, 40.

The isolated high voltage to low voltage DC/DC circuit 28 includes an electromagnetic interference filter 42, a capacitor 44, and high voltage to low voltage power converter circuitry 46. The electromagnetic interference filter 42 is connected across the capacitor 44 and directly connected to the traction battery 16. The capacitor 44 is connected between the link capacitor 26 and high voltage to low voltage power converter circuitry 46. The high voltage to low voltage power converter circuitry 46 is directly connected to the auxiliary battery 18.

The onboard charge controller 20 is in communication with and/or exerts control over the components illustrated in FIG. 1.

Referring to FIG. 2, the system 12 includes an electric machine 48, an ISC 50, and a traction battery 52. The ISC 50 is connected between the electric machine 48 and traction battery 52.

The ISC 50 has a three-phase inverter designed to drive the electric machine 48 and operates at much higher power than the BCCM 14. The BCCM 14 also has three circuits configured as a three-phase inverter/rectifier. Two disconnect circuits are required to utilize the ISC's three-phase inverter in charging/discharging the traction battery 16. The first disconnect circuit is used to disconnect the electric motor 48 from the ISC 50, and the second disconnect is used to disconnect the ISC 50 from the traction battery 52. The contactors used in these disconnect circuits must carry the ISC's full current. Adding these contactors increases bill of material counts—making electric level integration unfavorable. Package level integration, however, can provide advantages since it reduces the overall package size and/or weight, and the number of connectors and wires. Here, a new circuit topology is proposed that addresses some of the disconnect circuitry's issues. The schematics of such a system 54 is shown in FIG. 3 within the context of vehicle 55.

Figure 3:
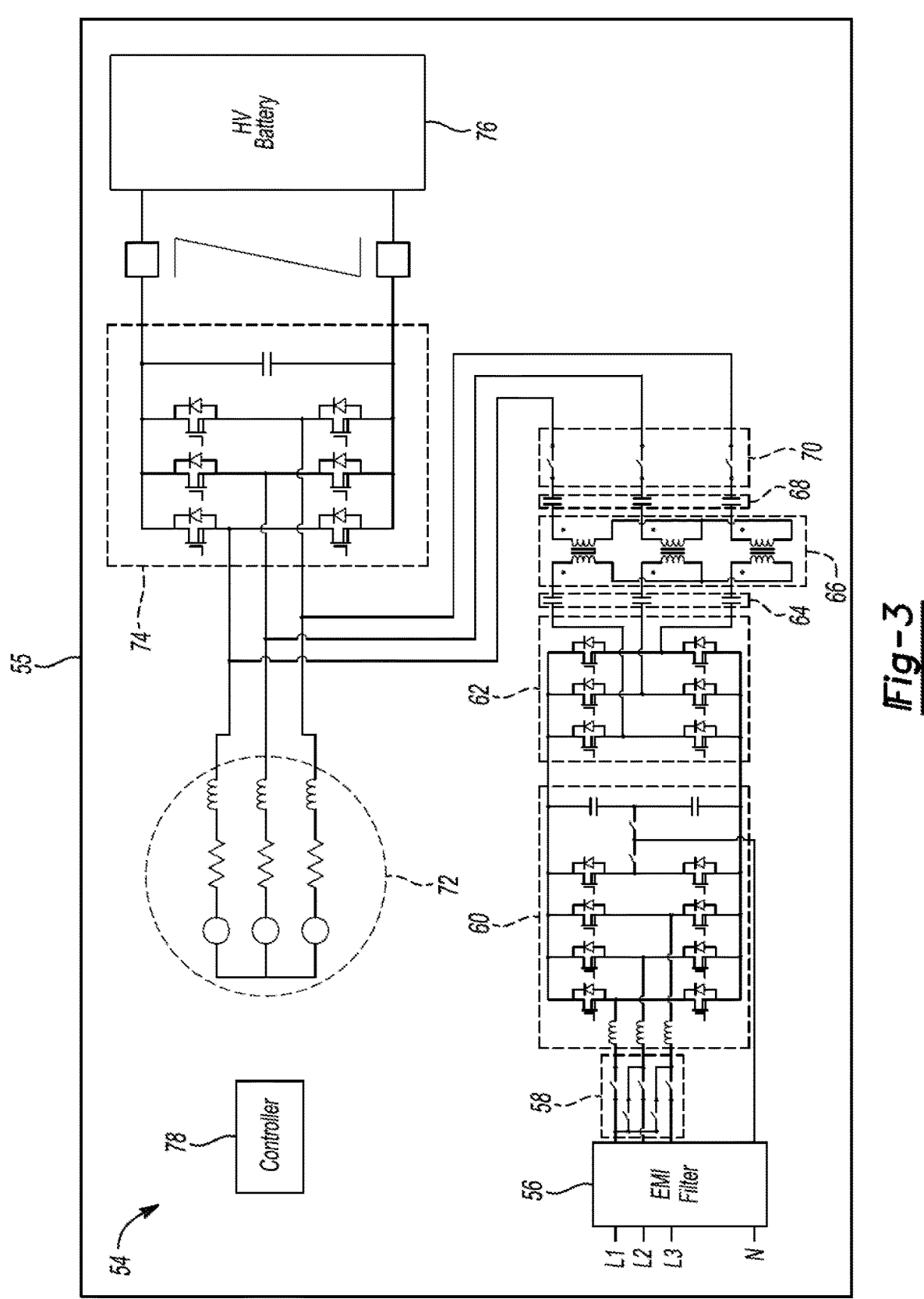
FIG. 3 is a schematic diagram of a system including an integrated battery current control module and inverter system controller.

Referring to FIG. 3, the system 54 includes an electromagnetic interference filter 56, a switch bank 58, an AC/DC power converter 60, a switching bridge 62, a capacitor bank 64, a transformer 66, a capacitor bank 68, a switch bank 70, an electric machine 72 a switching bridge 74, a traction battery 76, and a controller 78.

The switch bank 58 is connected between the electromagnetic interference filter 56 and AC/DC power converter 60. The switching bridge 62 is connected between the AC/DC power converter 60 and capacitor bank 64. The transformer 66 is connected between the capacitor banks 64, 68. The capacitor bank 68 is connected between the transformer and switch bank 70. The transformer 66 is thus also connected between the switching bridge 62 and switch bank 70.

The switching bridge 74 is connected between the electric machine 72 and traction battery 76.

The controller 78 is in communication with and/or exerts control over the components illustrated in FIG. 3.

The switch bank 70 is connected with a secondary side of the transformer 66: When switches of the switch bank 70 are closed, the transformer 66 is connected between the electric machine 72 and switching bridge 74 such that the switching bridge 62, transformer 66, electric machine 72, and switching bridge 74 form an isolated DC/DC power converter. The controller 78 may close the switches of the switch bank 70 responsive to a request to charge the traction battery 76. When closed energy received from, for example, a grid received at the electromagnetic interference filter 56 via L1, L2, L3, and N may be conditioned and transferred through the now formed isolated DC/DC power converter to the traction battery 76. The controller 78 may operate switches of the AC/DC power converter 60 and switching bridges 62, 64, for example, at 300 kHz when the switches of the switch bank 70 are closed (i.e., during charge mode.) When the charge is complete, the controller 78 may open the switches of the switch bank 70. The controller 78 may operate the switches of the switching bridge 64, for example, at 30 kHz (or less) when the switches of the switch bank 70 are open (e.g., during drive mode). Other switch speeds, of course, may be used.

The circuit topology presented in FIG. 3 allows for integrating a BCCM (the electromagnetic interference filter 56, switch bank 58. AC/DC power converter 60, switching bridge 62, capacitor bank 64, transformer 66, capacitor bank 68, and switch bank 70) with an ISC without using high current contactors. The add-on circuitry is interfaced directly with the ISC without disconnecting the electric machine or traction battery. The add-on circuitry includes a front-end AC/DC power factor correction circuit and portions of the isolated high voltage DC/DC circuit that is part of the BCCM. Three relays are added for disconnecting the add-on circuitry from the ISC during drive mode. The BCCM's high voltage DC/DC circuit can be designed considering the electric machine's stator winding impedance and its variations with respect to rotor position. When the vehicle is plugged into the AC grid, the add-on circuitry, ISC, and electric motor form a bidirectional AC/DC-DC/AC power converter. The BCCM's high voltage DC/DC power converter can be designed to switch at a frequency much higher than the ISC's switching frequency.

Figure 4:
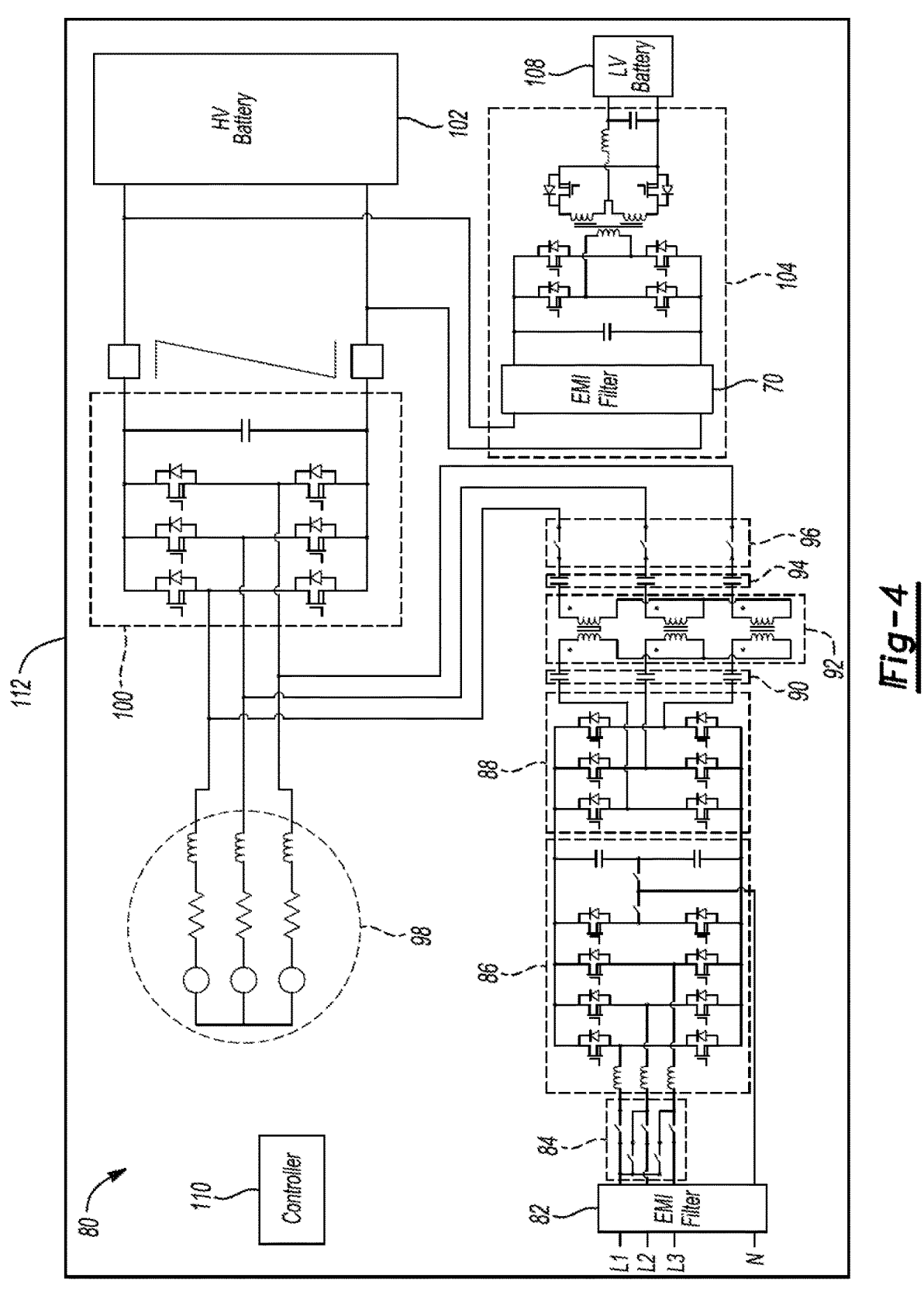
FIG. 4 is a schematic diagram of a system including an integrated battery current control module, inverter system controller, and high voltage to low voltage DC/DC converter.

Referring to FIG. 4, a system 80 includes an electromagnetic interference filter 82, a switch bank 84, an AC/DC power converter 86, a switching bridge 88, a capacitor bank 90, a transformer 92, a capacitor bank 94, a switch bank 96, an electric machine 98, a switching bridge 100, a traction battery 102, a high voltage to low voltage DC/DC power converter 104, an auxiliary battery 106, and a controller 110. These components are shown within the context of vehicle 112. The controller 110 is in communication with and/or exerts control over the components illustrated in FIG. 4.

The electromagnetic interference filter 82, switch bank 84, AC/DC power converter 86, switching bridge 88, capacitor bank 90, transformer 92, capacitor bank 94, switch bank 96, electric machine 98, switching bridge 100, and traction battery 102 are arranged, and can be operated by the controller 110, in a manner similar to FIG. 3.

The high voltage to low voltage DC/DC power convert 104 is connected between the switching bridge 100 and traction battery 102. It is further connected with the auxiliary battery 108 such that, when the high voltage to low voltage DC/DC power converter 104 is operating, power from the switching bridge 100 may flow through the high voltage to low voltage DC/DC power converter 104 to the auxiliary battery 108.

Integrating the BCCM (the electromagnetic interference filter 82, switch bank 84, AC/DC power converter 86, switching bridge 88, capacitor bank 90, transformer 92, capacitor bank 94, and switch bank 96) with the inverter system controller (the switch bank 100) is estimated to increase the ISC's package size by 50%. With a larger package size, the module's location may be constrained. Hence, there is a need to reduce packaging size.

The high voltage to low voltage DC/DC power converter 104 contributes to the required packaging space. In some arrangements, the high voltage circuit of the high voltage to low voltage DC/DC power converter 104 consumes almost half of its overall size. The following topology eliminates the high voltage circuit.

Figure 5:
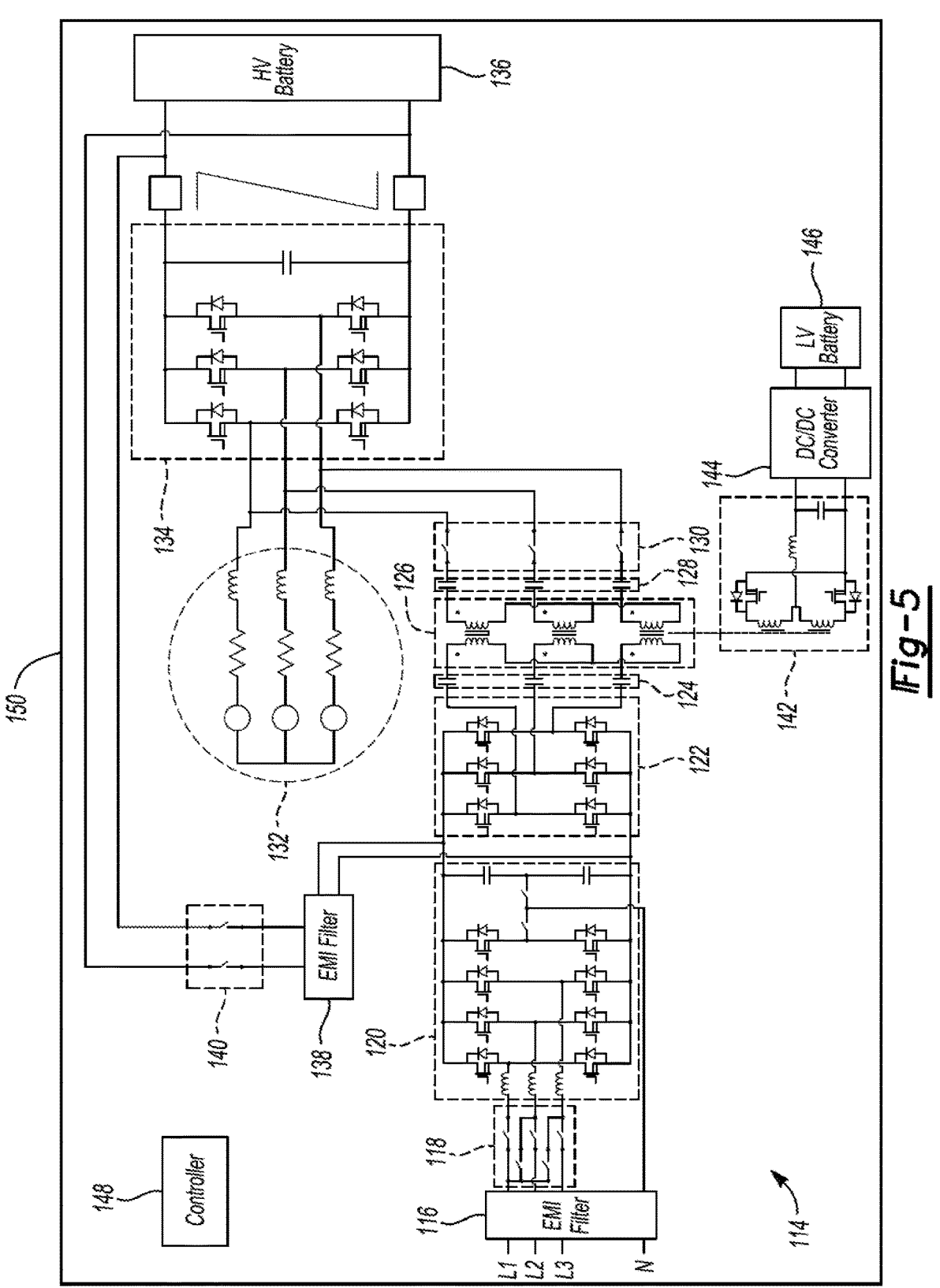
FIG. 5 is a schematic diagram of a system including an integrated battery current control module, inverter system controller, rectifier, and DC/DC converter.

Referring to FIG. 5, a system 114 includes an electromagnetic interference filter 116, a switch bank 118, an AC/DC power converter 120, a switching bridge 122, a capacitor bank 124, a transformer 126, a capacitor bank 128, a switch bank 130, an electric machine 132, a switching bridge 134, a traction battery 136, an electromagnetic interference filter 138, a switch bank 140, a rectifier 142, a DC/DC power converter, an auxiliary battery 146, and a controller 148. These components are shown within the context of vehicle 150.

The electromagnetic interference filter 116, switch bank 118, AC/DC power converter 120, switching bridge 122, capacitor bank 124, transformer 126, capacitor bank 128, switch bank 130, electric machine 132, switching bridge 134, and traction battery 136 are arranged in, and can be operated by the controller 148, in a manner similar to FIGS. 3 and 4. The components of FIG. 5 are thus in communication with and/or under the control of the controller 148.

The electromagnetic interference filter 138 is directly connected between the AC/DC power converter 120 and switch bank 122. The switch bank 140 is arranged to connect the electromagnetic interference filter 138 directly with the traction battery 136 such that power output from the AC/DC power converter 120 may flow directly to the traction battery 136 via the electromagnetic interference filter 138 and switch bank 140.

The rectifier 142 is magnetically coupled with the transformer 126 via a low voltage coil and common core. The DC/DC power converter 144 is connected between the rectifier 142 and auxiliary battery 146 such that power from the transformer 142 may flow through the rectifier 142 and DC/DC power converter 144 to the auxiliary battery 146. The DC/DC power converter 144 may provide additional power management to the auxiliary battery 146.

The rectifier 142 may be implemented as a center-tap rectifier, a full-bridge rectifier, a half-bridge rectifier, a current doubler, etc. The low voltage coil can be implemented as a center-tap coil or single coil. The rectifier 142 rectifies the voltage induced across the low voltage coil for delivering DC power to the auxiliary battery 146.

As alluded to above, the switch bank 140 electrically connects the traction battery 136 to the BCCM's intermediate DC bus. When the vehicle 150 is disconnected from the AC grid or is in drive mode, all other relays, including the switch bank 130, are open. The BCCM's intermediate DC bus is energized by closing the switch bank 140. An isolated high voltage to low voltage DC/DC power converter is thus configured for charging the auxiliary battery 146. The transformer's primary windings and low voltage coil are energized for charging/discharging the auxiliary battery 146.

When the vehicle 150 is connected to the AC grid, the controller 148 generates commands such that the switch bank 140 is open, and the switch bank 130 is closed. The switch bank 118 is configured depending on grid type (e.g., single-phase, two-phase, three-phase, etc.). All transformer windings are energized to allow for bidirectional power flow between the AC grid and the traction battery 136, and between the traction battery 136 and auxiliary battery 146.

While this level of integration enables the elimination of the rectifier and electromagnetic interference filter that are part of the AC/DC battery charger, there is still opportunity to reduce the package size further. The electromagnetic interference filter 138 and series capacitors (electrolytic capacitor bank) of the AC/DC power converter 120 may consume 50% of the overall space. Here, an active ripple energy storage circuit is proposed to reduce the electrolytic capacitor size by, for example, up to 70%. This active ripple energy storage circuit may be configured as a bidirectional DC/DC converter to provide added functionality when the vehicle is disconnected from the AC grid.

Figure 6:
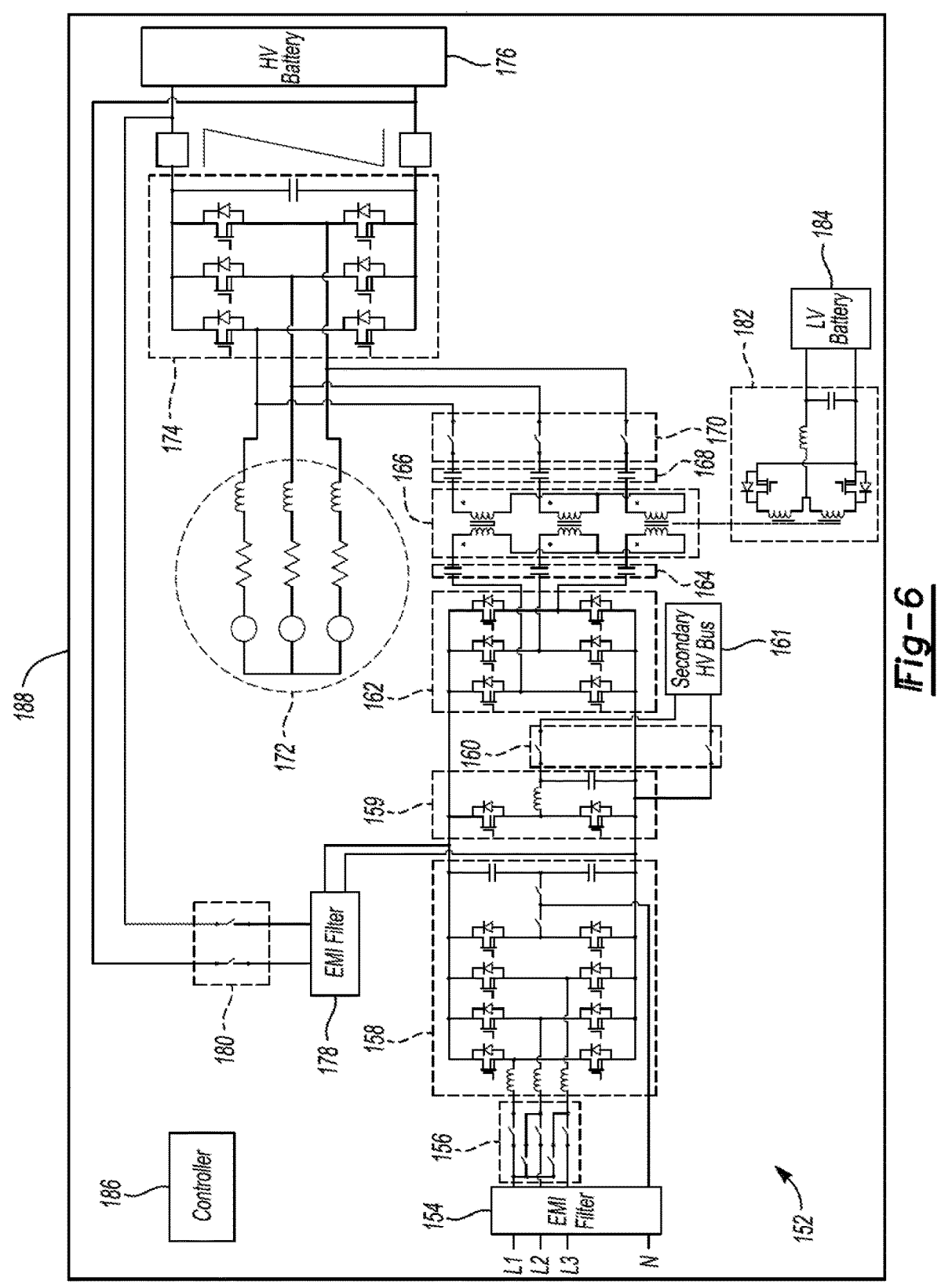
FIG. 6 is a schematic diagram of a system including an active ripple energy storage circuit, integrated battery current control module, inverter system controller, rectifier, and DC/DC converter.

Referring to FIG. 6, a system 152 includes an electromagnetic interference filter 154, a switch bank 156, an AC/DC power converter 158, an active ripple energy storage circuit 159, switches 160, a secondary bus 161, a switching bridge 162, a capacitor bank 164, a transformer 166, a capacitor bank 168, a switch bank 170, an electric machine 172, a switching bridge 174, a traction battery 176, an electromagnetic interference filter 178, a switch bank 180, a rectifier 182, an auxiliary battery 184, and a controller 186. These components are shown within the context of vehicle 188.

The electromagnetic interference filter 154, switch bank 156, AC/DC power converter 158, switching bridge 162, capacitor bank 164, transformer 166, capacitor bank 168, switch bank 170, electric machine 172, switching bridge 174, and traction battery 176 are arranged in (with the exception of the active ripple energy storage circuit 159, switches 160, and secondary bus 161), and can be operated by the controller 186, in a manner similar to FIGS. 3 and 4. The components of FIG. 6 are thus in communication with and/or under the control of the controller 186.

The electromagnetic interference filter 178 is directly connected between the active ripple energy storage circuit 159 and switch bank 162. The active ripple energy storage circuit 159 is thus connected between the AC/DC power converter 158 and switching bridge 162. The switch bank 180 is arranged to connect the electromagnetic interference filter 178 directly with the traction battery 176 such that power output from the AC/DC power converter 158 may flow directly to the traction battery 176 via the electromagnetic interference filter 178 and switch bank 180.

The rectifier 182 is magnetically coupled with the transformer 166 via a low voltage coil and common core such that power from the transformer 142 may flow through the rectifier 182 to the auxiliary battery 184. As with FIG. 5, this topology may include a DC/DC power converter to provide additional power management to the auxiliary battery 184.

The rectifier 182 may be implemented as a center-tap rectifier, a full-bridge rectifier, a half-bridge rectifier, a current doubler, etc. The low voltage coil can be implemented as a center-tap coil or single coil. The rectifier 182 rectifies the voltage induced across the low voltage coil for delivering DC power to the auxiliary battery 184.

As alluded to above, the switch bank 180 electrically connects the traction battery 176 to the BCCM's intermediate DC bus. When the vehicle 188 is disconnected from the AC grid or is in drive mode, all other relays, including the switch bank 170, are open. The BCCM's intermediate DC bus is energized by closing the switch bank 180. An isolated high voltage to low voltage DC/DC power converter is configured for charging the auxiliary battery 184. The transformer's primary windings and low voltage coil are energized for charging/discharging the auxiliary battery 184.

When the vehicle 188 is connected to the AC grid, the controller 186 generates commands such that the switch bank 180 is open, and the switch bank 170 is closed. The switch bank 156 is configured depending on grid type (e.g., single-phase, two-phase, three-phase, etc.). All transformer windings are energized to allow for bidirectional power flow between the AC grid and the traction battery 176, and between the traction battery 176 and auxiliary battery 184.

The active ripple energy storage circuit 159 is designed to absorb the low-frequency ripple voltage across the electrolytic capacitors during single-phase operation. This converter acts as a charge/discharge circuit with net zero power. It is further designed using a bidirectional buck/boost converter. The high voltage input is connected to the BCCM's intermediate DC bus, and the low voltage output is connected to a film capacitor interfaced to a receptacle via disconnect switches.

While the vehicle 188 is disconnected from an AC grid or in drive mode, the high voltage to low voltage DC/DC converter is energized from the BCCM's intermediate DC bus for charging the auxiliary battery 184. The switch bank 180 is closed to interface the traction battery 176 to the BCCM's intermediate DC bus, and the switch bank 170 is opened for disconnecting the switching bridge 174 from the BCCM circuit. The active ripple energy storage circuit 159 is used to form a non-isolated buck converter for stepping down the voltage of the traction battery 176 (e.g., 800V) to a lower voltage level (e.g., 400V). The switches 160 are closed to connect loads (not directly connected to the traction battery 176) to the secondary (non-isolated) bus 184.

The maximum miles traveled range for an electric vehicle is considerably reduced when towing a heavy load such as a trailer or camper. Increasing the miles traveled on a single charge while towing requires a battery with higher capacity (i.e., kWh rating). While increasing the battery's capacity leads to an extended range for miles traveled, the added battery weight reduces the battery-to-wheel efficiency.

Trailers or campers that include a battery onboard can extend the miles traveled range on a single charge. Such a system requires interfacing the trailer's battery with the traction battery. An isolated DC/DC converter is needed to charge the traction battery from the trailer's battery while driving. While the isolated DC/DC circuit of a standalone BCCM can provide the isolation function, the isolated DC/DC circuit of an integrated ISC-BCCM system (e.g., FIG. 5) cannot be utilized. Referring to FIG. 5, the ISC 134 is used as a rectifier, coupling the transformer's secondary windings (by closing the switch bank 130 and opening the switch bank 140) to the traction battery 136 when charging the traction battery 136 from the AC grid. During drive mode, the switch bank 130 is open, and the switch bank 140 is closed to disconnect the BCCM's circuit from the ISC 134 and connect the traction battery 136 to the intermediate DC bus.

Moreover, powering the auxiliary battery 146 requires closing the switch bank 140. Traction battery voltage is applied across the BCCM's intermediate DC bus for energizing the transformer's primary windings-power is coupled between the transformer's primary windings and secondary low voltage coil for charging the auxiliary battery 146. Hence, the BCCM's intermediate DC bus is not isolated. There is a need to create a second isolated high voltage bus for interfacing the traction battery 136 with another high voltage battery.

The following proposes to use active ripple energy storage circuitry to implement another high voltage DC/DC converter. An add on circuitry is magnetically coupled to the inductor of an active ripple energy storage circuit. The add-on circuit includes a coil, a switch, and a bi-directional active rectifier/inverter. A switch can disconnect the add-on circuit from the active ripple energy storage circuit inductor when interfacing the BCCM with a single-phase AC source or load. Otherwise, the switch can be closed. A loosely coupled transformer (e.g., k~0.4-0.7) can be implemented by adding a second winding to the inductor of the active ripple energy storage circuit.

Upper and lower field effect transistors (e.g., metal-oxide-semiconductor field effect transistors (MOSFET)) of the active ripple energy storage circuit form a half-bridge inverter with a square wave output. When the upper MOSFET is ON and the lower MOSFET is OFF, the DC bus voltage determines the voltage across a pair of series connected capacitors of an AC/DC power converter (e.g., 800V). When the lower MOSFET is ON and the upper MOSFET is OFF, the voltage across the pair of series connected capacitors is zero. The frequency and duty cycle of the square wave output are controlled to manage the bidirectional power flow between a traction battery and a trailer's high voltage battery.

Film capacitor blocks of the active ripple energy storage circuit filter the DC component of the generated square wave. Hence, the voltage applied across the loosely coupled transformer's primary winding is a two-level square wave with voltage changing from negative half DC bus voltage to positive half DC bus voltage (–VDC/2 to +VDC/2).

A matching network (e.g., capacitors, inductors) can be added between the loosely coupled transformer's secondary winding and an H-bridge of the active ripple energy storage circuitry. In one configuration, the capacitor is connected in series with the winding. Other configurations include parallel compensation, etc.

The H-bridge of the add-on circuit operates at the same frequency as the half-bridge of the active ripple energy storage circuit. The phase shift between the H-bridge and half-bridge is controlled to manage the power delivered to an isolated high voltage DC bus of the add on circuit. Additionally, the phase shift between the inverter legs can be controlled to adjust the DC/DC gain.

An electromagnetic interference filter can be added between the switching supply and isolated high voltage DC bus for attenuating the differential mode and common-mode currents generated by the switching supply.

Figure 7A:
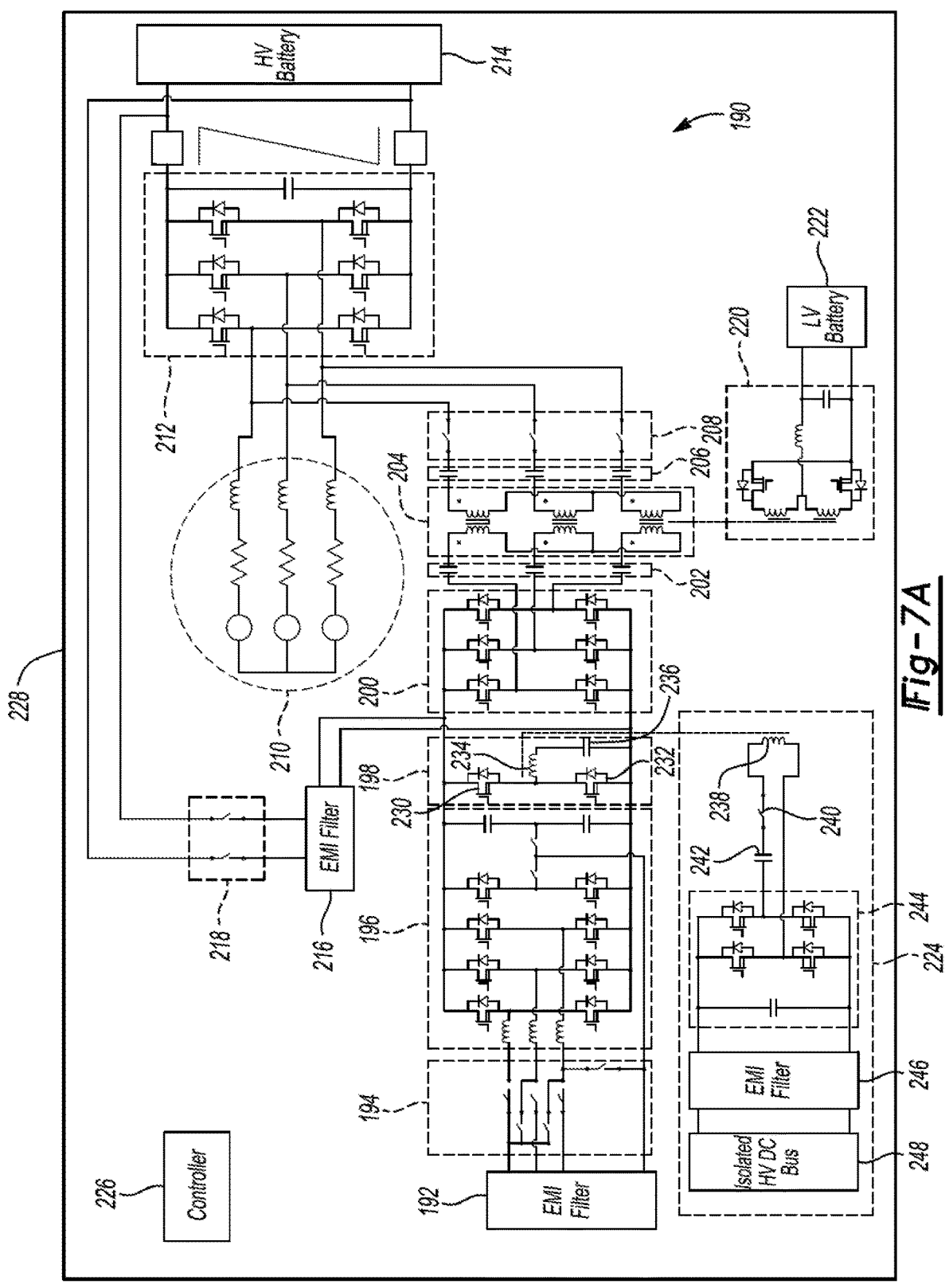
FIGS. 7A-7D are schematic diagrams of systems including circuit arrangements coupled with inductors of active ripple energy storage circuits.

Referring to FIG. 7A, a system 190 includes an electromagnetic interference filter 192, a switch bank 194, an AC/DC power converter 196, an active ripple energy storage circuit 198, a switching bridge 200, a capacitor bank 202, a transformer 204, a capacitor bank 206, a switch bank 208, an electric machine 210, a switching bridge 212, a traction battery 214, an electromagnetic interference filter 216, a switch bank 218, a rectifier 220, an auxiliary battery 222, a circuit arrangement 224, and a controller 226. These components are shown within the context of vehicle 228.

The components of FIG. 7A, with the exception of the circuit arrangement 224, are arranged in, and can be operated by the controller 226, in a manner similar to FIGS. 3-6. The components of FIG. 7 are thus in communication with and/or under the control of the controller 226.

The active ripple energy storage circuit 198 includes a pair of switches 230, 232, an inductor 234, and a capacitor 236. The switches 230, 232 are in series, and collectively in parallel with capacitors of the AC/DC power converter 196. The inductor 234 and capacitor 236 are in series. The inductor 234 and switches 230, 232 share a node.

The circuit arrangement 224 includes coil 238, a switch 240, a capacitor 242, a switching bridge 244, an electromagnetic interference filter 246, and a high voltage DC bus 248. The coil 238 is magnetically coupled with the inductor 234 (e.g., at a magnetic coupling of 0.7 or less). The switch 240 and capacitor 242 are in series, and collectively connected between the coil 238 and switching bridge 244. The electromagnetic interference filter 246 is connected between the switching bridge 244 and high voltage DC bus 248.

A switch can be added to split the active ripple energy storage circuit's film capacitor into two capacitors. The primary side capacitor is used not only to block the DC voltage but also for reactance matching. By switching out a portion of the capacitor, the capacitance can be decreased to realize resonance with the transformer's leakage inductance.

Figure 7B:
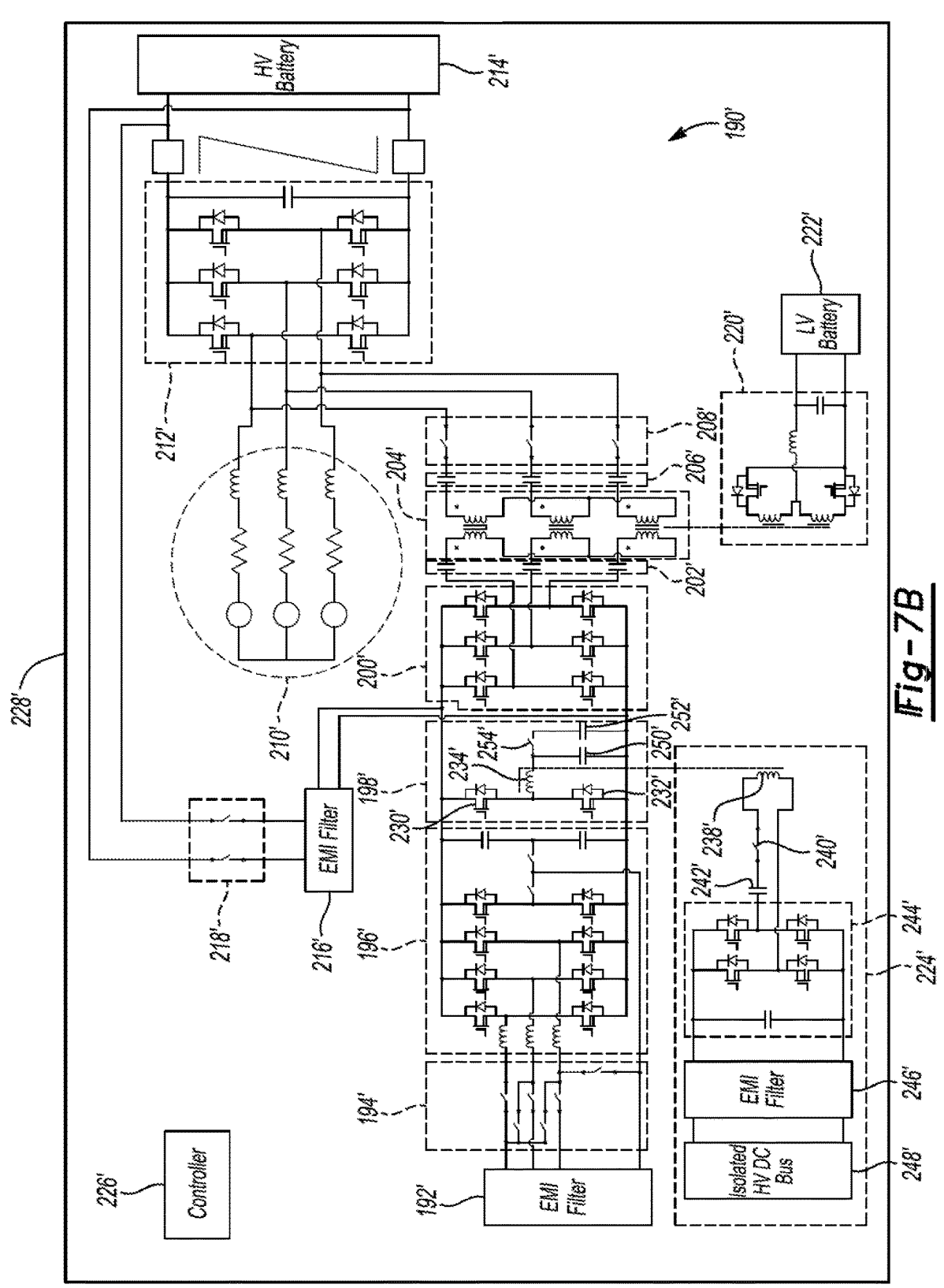

Referring to FIG. 7B, the active ripple energy storage circuit 198' includes a pair of switches 230', 232', an inductor 234', a pair of capacitors 250', 252', and a switch 254'. The switches 230', 232' are in series, and collectively in parallel with series connected capacitors of the AC/DC power converter 196. The inductor 234', capacitor 250', and switch 254' share a common node such that when the switch 254' is closed, the capacitors 250', 252' are in parallel.

With regard to the active ripple energy storage circuit, a series capacitor may be added with the switch, and another switch may be added to disconnect the active ripple energy storage circuit's film capacitor. A half-bridge active rectifier can be implemented by splitting the DC bus electrolytic capacitors via the switch being ON and the another switch being OFF. An added capacitor in series with the switch can serve the purpose of reactance matching.

Figure 7C:
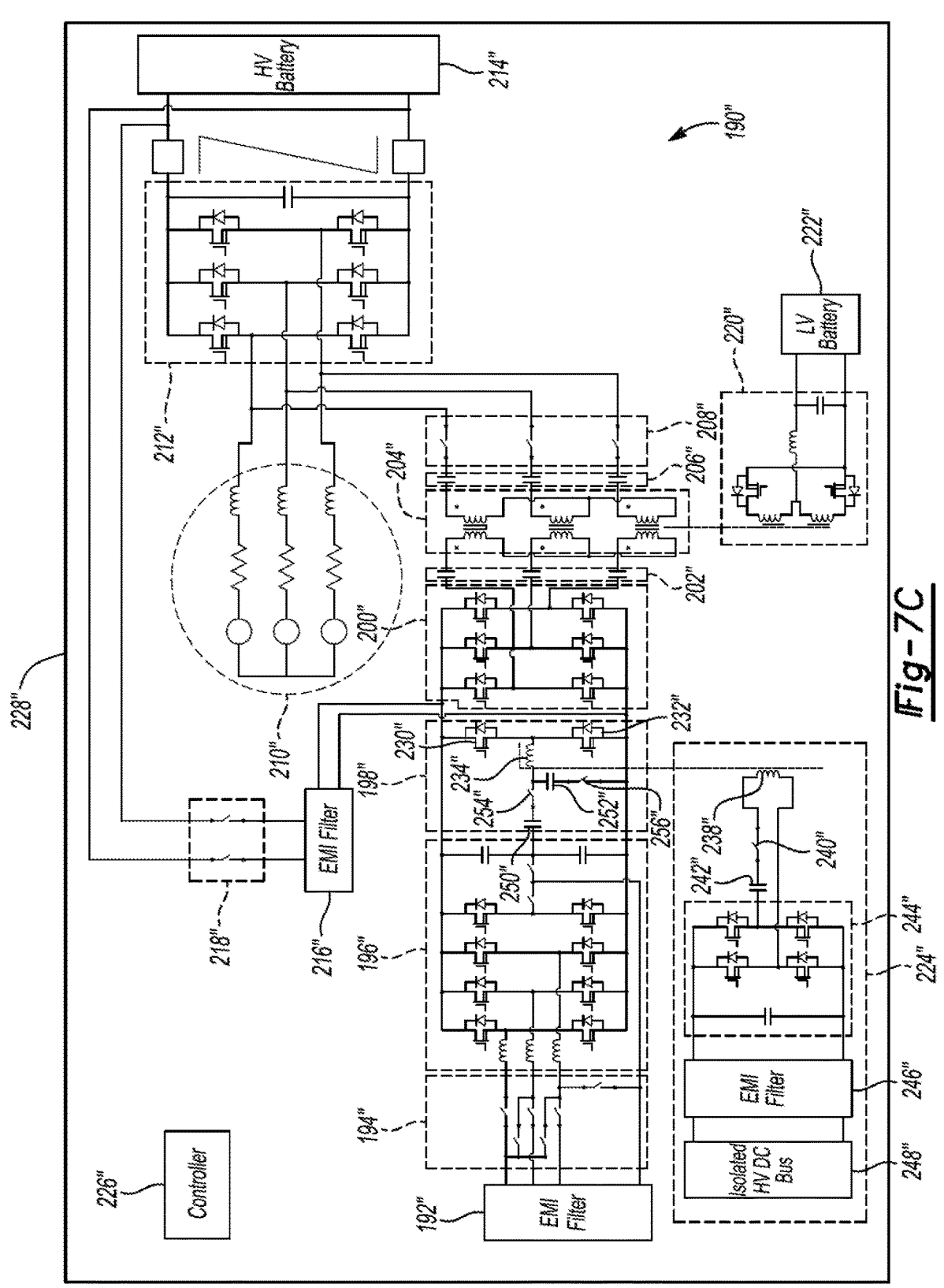

Referring to FIG. 7C, the active ripple energy storage circuit 198" includes a pair of switches 230", 232", an inductor 234", a pair of capacitors 250", 252", and a pair of switches 254", 256". The switches 230", 232" are in series, and collectively in parallel with a leg of the switching bridge 200. The inductor 234" and switches 230", 232" share a common node. The inductor 234", capacitor 252", and switch 254" share a common node. The capacitor 250" and switch 254" are in series and connected between a pair of series connected capacitors of the AC/DC power converter 196. The capacitor 252" and switch 256" are in series.

Figure 7D:
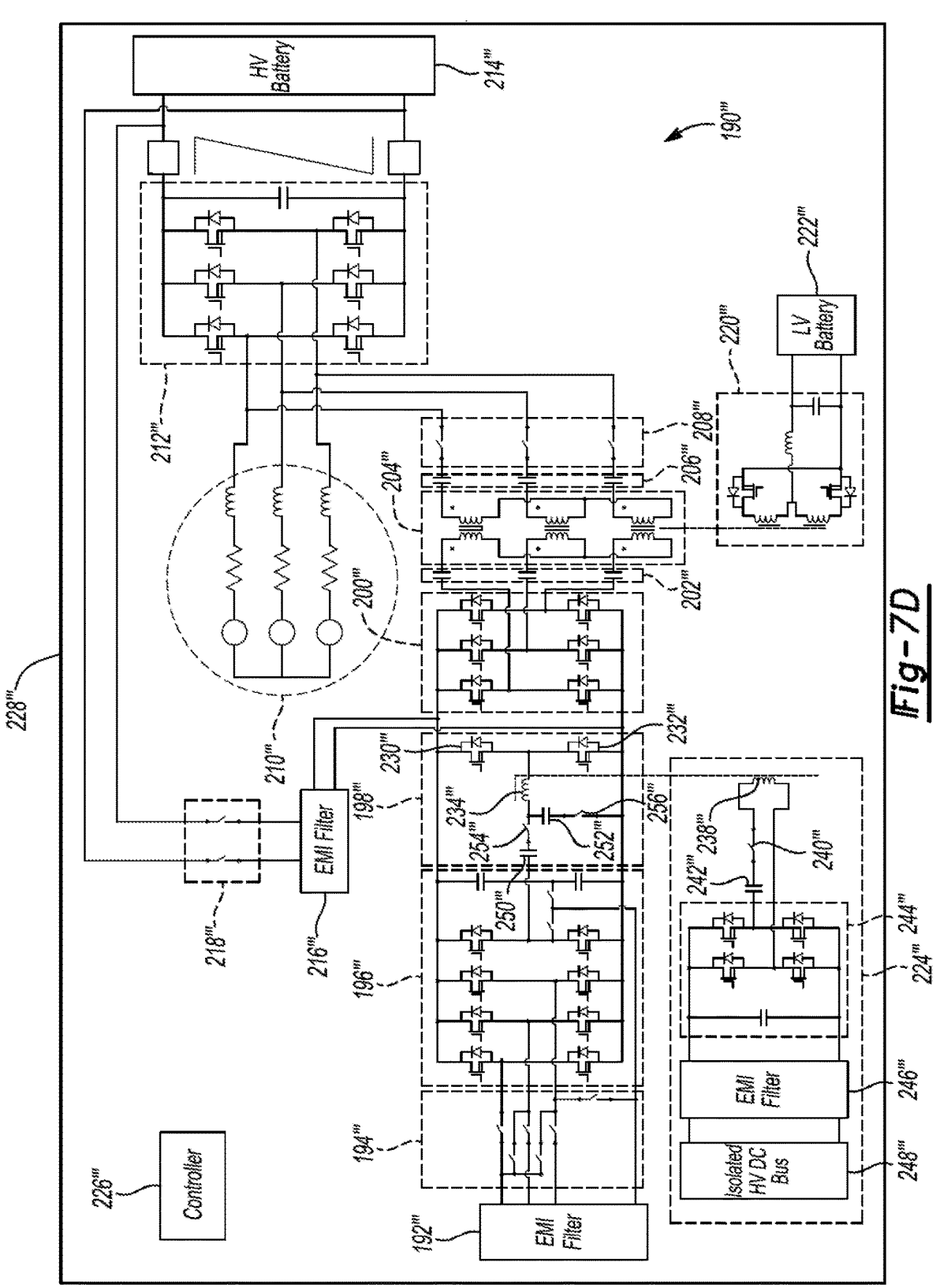

A full bridge may also be implemented. Referring to FIG. 7D, the active ripple energy storage circuit 198''' includes a pair of switches 230''', 232''', an inductor 234''', a pair of capacitors 250''', 252''', and a pair of switches 254''', 256'''. The switches 230''', 232''' are in series, and collectively in parallel with a leg of the switching bridge 200. The inductor 234''' and switches 230''', 232''' share a common node. The inductor 234''', capacitor 252''', and switch 254''' share a common node. The capacitor 250''' and switch 254''' are in series and connected between a pair of series connected switches of a leg of the AC/DC power converter 196. The capacitor 252''' and switch 256''' are in series. The half-bridge formed by the leg of the AC/DC power converter 196 and the half-bridge formed by the active ripple energy storage leg are configured to create a full bridge rectifier by closing the switch 254''' and opening the switch 256'''.

The algorithms, methods, or processes disclosed herein can be deliverable to or implemented by a computer, controller, or processing device, which can include any dedicated electronic control unit or programmable electronic control unit. Similarly, the algorithms, methods, or processes can be stored as data and instructions executable by a computer or controller in many forms including, but not limited to, information permanently stored on non-writable storage media such as read only memory devices and information alterably stored on writeable storage media such as compact discs, random access memory devices, or other magnetic and optical media. The algorithms, methods, or processes can also be implemented in software executable objects. Alternatively, the algorithms, methods, or processes can be embodied in whole or in part using suitable hardware components, such as application specific integrated circuits, field-programmable gate arrays, state machines, or other hardware components or devices, or a combination of firmware, hardware, and software components.

While exemplary embodiments are described above, it is not intended that these embodiments describe all possible forms encompassed by the claims. With reference to FIG. 5, the capacitor banks 124, 128 could instead be inductor banks, or capacitor and inductor banks. The symbols used to represent capacitors of the capacitor banks 124, 128 can thus also represent inductors of such inductor banks, or represent capacitors and inductors of such capacitor and inductor banks. The switching bridges 122, 134 may be n-phase inverters or n-phase rectifiers depending on topology and functionality requirements, etc. The switching bridge 122, for example, may be configured as a single phase inverter by removing one of its phase legs. There may also be arrangements in which the BCCM is not integrated with the ISC. With reference FIGS. 7A-7D, the capacitor bank 206 may be directly connected with the switching bridge 212, and the switch bank 208, electric machine 210, electromagnetic interference filter 216, switch bank 218, and associated connections may be omitted, etc. The AC source/load, traction battery 214, and auxiliary battery 222 are all galvanically isolated from each other. Since the active ripple energy storage circuits and leg of the AC/DC power converter 196 form an isolated high voltage DC/DC converter, only three-phase AC loads can be connected during this configuration mode.

The words used in the specification are words of description rather than limitation, and it is understood that various changes may be made without departing from the spirit and scope of these disclosed materials. The terms "controller" and "controllers," for example, can be used interchangeably herein as the functionality of a controller can be distributed across several controllers/modules, which may all communicate via standard techniques.

As previously described, the features of various embodiments may be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics may be compromised to achieve desired overall system attributes, which depend on the specific application and implementation. These attributes may include, but are not limited to strength, durability, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and may be desirable for particular applications.

What is claimed is:

1. An automotive power system comprising:
a first switching bridge;
a first circuit arrangement including an AC/DC power converter, a transformer, a second switching bridge connected between the AC/DC power converter and the transformer, and a plurality of switches connected with an output of the transformer and configured to connect the output with the first switching bridge such that the first switching bridge is connected between a traction battery and the transformer, and the first switching bridge, the transformer, and the second switching bridge form an isolated DC/DC power converter;
an electromagnetic interference filter;
one or more switches, different than the plurality of switches, configured to directly connect the traction battery between the AC/DC power converter and the second switching bridge via the electromagnetic interference filter;
an active ripple energy storage circuit, including an inductor, connected between the AC/DC power converter and the one or more switches; and
a second circuit arrangement including a coil magnetically coupled with the inductor, a third switching bridge, and a switch, different than the plurality of switches and the one or more switches, connected between the coil and the third switching bridge.

2. The automotive power system of claim 1, wherein the active ripple energy storage circuit includes a pair of capacitors and a switch, different than the plurality of switches, the one or more switches, and the switch connected between the coil and the third switching bridge, configured to electrically connect the pair in parallel.

3. The automotive power system of claim 2, wherein the inductor, one of the pair, and the switch configured to electrically connect th pair in parallel share a node.

4. The automotive power system of claim 1, wherein the active ripple energy storage circuit includes a pair of capacitors and a pair of switches, different than the plurality of switches, the one or more switches, and the switch connected between the coil and the third switching bridge, wherein a first of the pair of capacitors and a first of the pair of switches are electrically connected in series, and wherein a second of the pair of capacitors and a second of the pair of switches are electrically connected in series.

5. The automotive power system of claim 4, wherein the inductor, the first of the pair of switches, and the second of the pair of capacitors share a node.

6. The automotive power system of claim 1 further comprising a DC bus and an electromagnetic filter connected between the third switching bridge and the DC bus.

7. The automotive power system of claim 1, wherein the coil is magnetically coupled with the inductor such that a magnetic coupling between the coil and inductor is 0.7 or less.

8. The automotive power system of claim 1, wherein the third switching bridge is a bidirectional switching bridge.

9. The automotive power system of claim 1, wherein the second circuit arrangement is configured such that the switch connected between the coil and the third switching bridge is open when a single-phase AC source is connected with the first circuit arrangement.

10. A method comprising:

responsive to a single-phase AC source being connected with a first circuit arrangement that includes an AC/DC power converter, a transformer, a first switching bridge connected between the AC/DC power converter and the transformer, and a plurality of switches connected with an output of the transformer and configured to connect the output with a second switching bridge such that the second switching bridge is connected between a traction battery and the transformer, and the first switching bridge, the transformer, and the second switching bridge form an isolated DC/DC power converter, opening a switch, different than the plurality of switches, of a second circuit arrangement that includes a coil magnetically coupled with an inductor of an active ripple energy storage circuit connected between the AC/DC power converter and the first switching bridge to disconnect a DC bus from the coil.

11. The method of claim 10, further comprising, after the single-phase AC source is disconnected from the first circuit arrangement, closing the switch of the second circuit arrangement.

12. A vehicle comprising:

a traction battery;

a first circuit arrangement including an AC/DC power converter, a transformer, a first switching bridge connected between the AC/DC power converter and the transformer, and a second switching bridge connected between the traction battery and the transformer such that the first switching bridge, the transformer, and the second switching bridge form an isolated DC/DC power converter;

an active ripple energy storage circuit, including an inductor, connected between the AC/DC power converter and the second switching bridge; and a second circuit arrangement including a coil magnetically coupled with the inductor, a third switching bridge, and a switch connected between the coil and third switching bridge.

13. The vehicle of claim 12, wherein the active ripple energy storage circuit includes a pair of capacitors and a switch, different than the switch connected between the coil and third switching bridge, configured to electrically connect the pair in parallel.

14. The vehicle of claim 13, wherein the inductor, one of the pair, and the switch configured to electrically connect the pair in parallel share a node.

15. The vehicle of claim 12, wherein the active ripple energy storage circuit includes a pair of capacitors and a pair of switches different than the switch connected between the coil and third switching bridge, wherein a first of the pair of capacitors and a first of the pair of switches are electrically connected in series, and wherein a second of the pair of capacitors and a second of the pair of switches are electrically connected in series.

16. The vehicle of claim 15, wherein the inductor, the first of the pair of switches, and the second of the pair of capacitors share a node.

17. The vehicle of claim 12 further comprising a DC bus and an electromagnetic filter connected between the third switching bridge and the DC bus.

18. The vehicle of claim 12, wherein the coil is magnetically coupled with the inductor such that a magnetic coupling between the coil and inductor is 0.7 or less.

19. The vehicle of claim 12, wherein the third switching bridge is a bidirectional switching bridge.

\* \* \* \* \*